Sept. 18, 1945. L. I. YEOMANS 2,385,247
METHOD OF GENERATING BEARING SURFACES
Filed Nov. 17, 1943 4 Sheets-Sheet 2
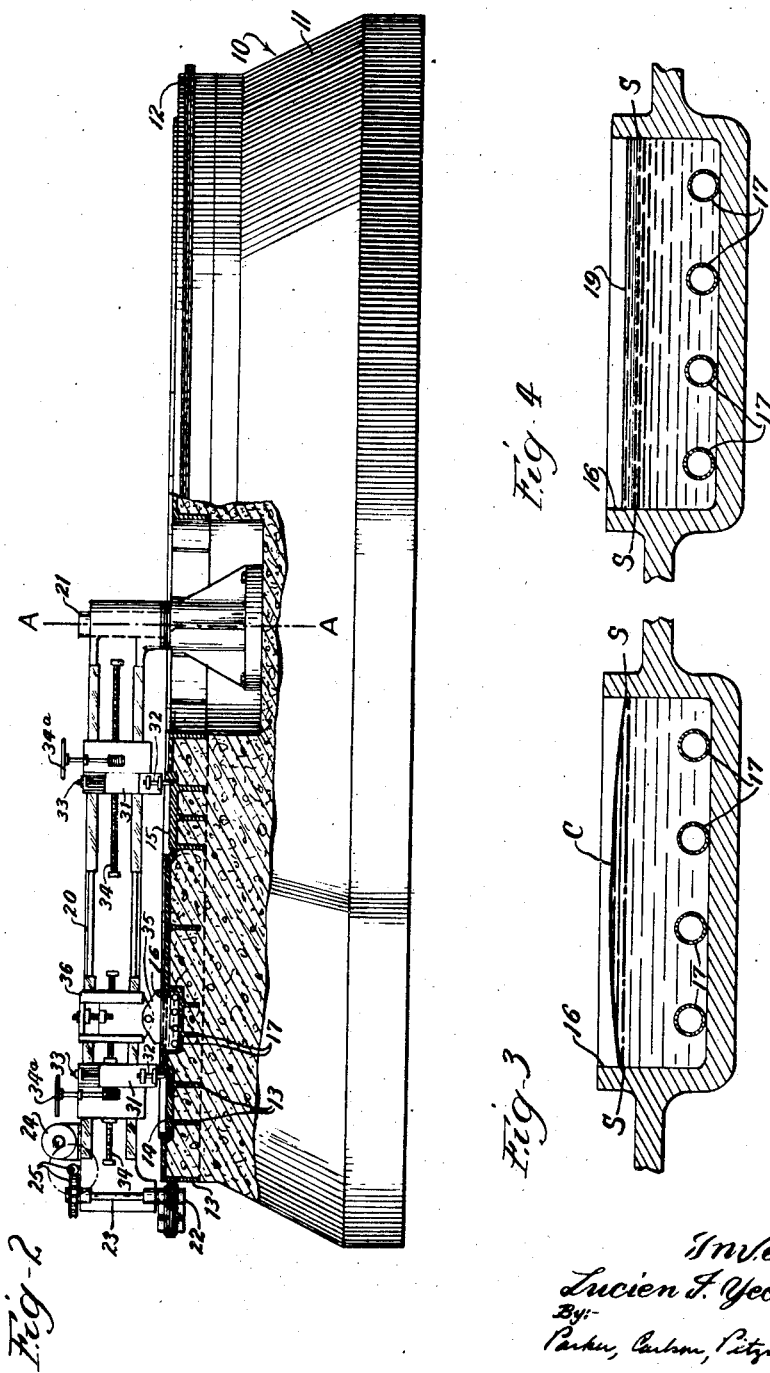

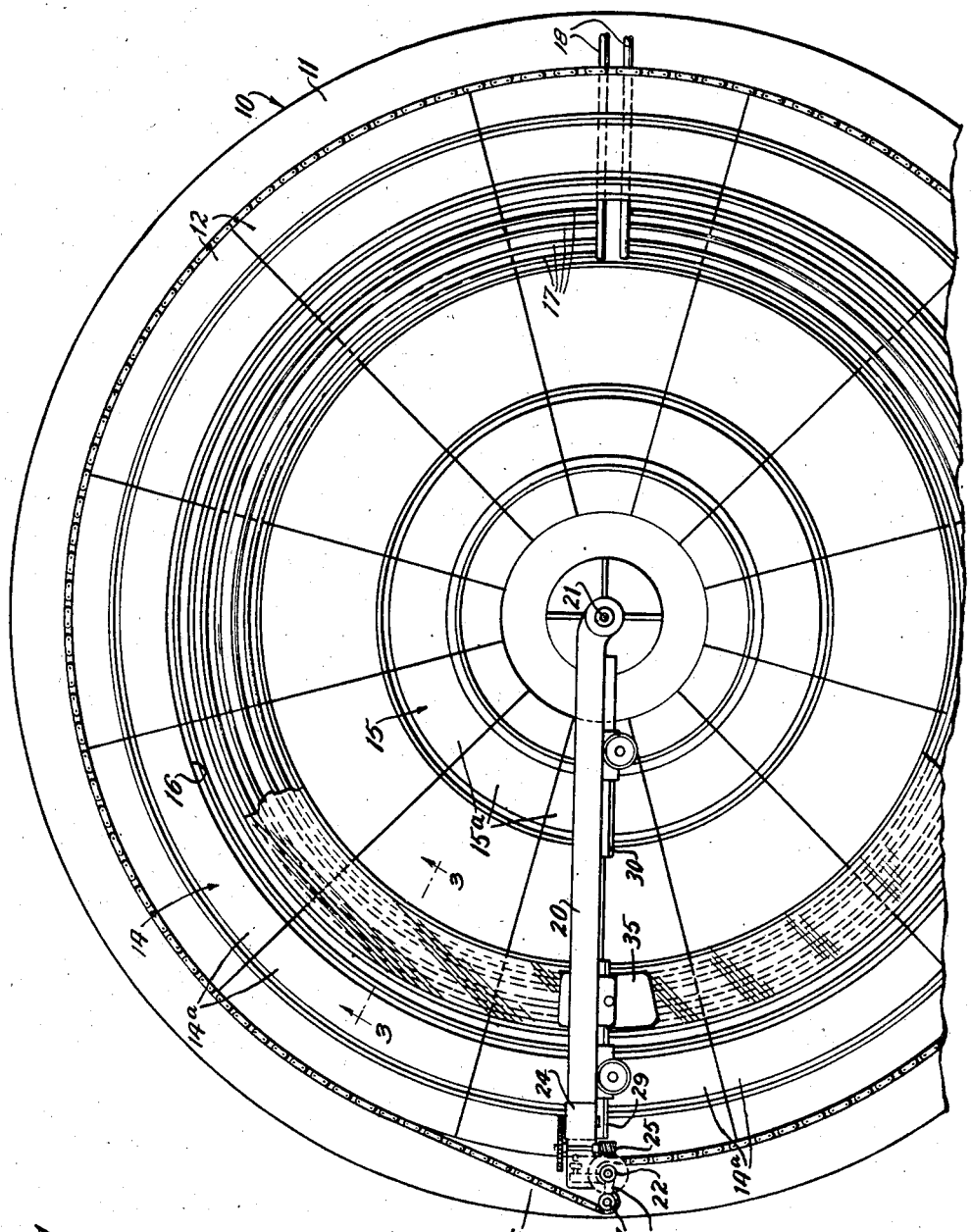

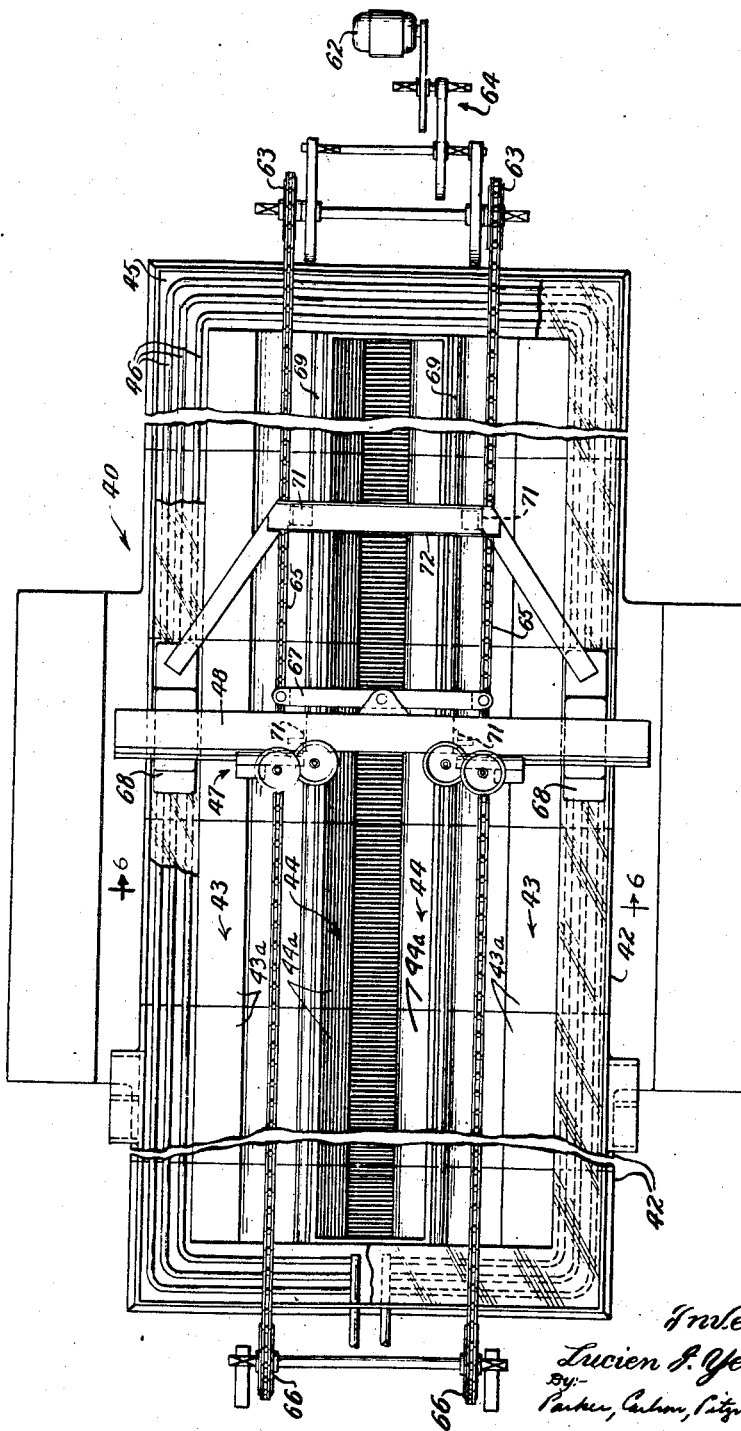

Sept. 18, 1945. L. I. YEOMANS 2,385,247
METHOD OF GENERATING BEARING SURFACES
Filed Nov. 17, 1943 4 Sheets-Sheet 4

Inventor.
Lucien I. Yeomans
By Parker, Carlson, Pitzner & Hubbard
Attys.

Patented Sept. 18, 1945

2,385,247

UNITED STATES PATENT OFFICE 2,385,247

METHOD OF GENERATING BEARING SURFACES

Lucien I. Yeomans, Chicago, Ill.

Application November 17, 1943, Serial No. 510,605

8 Claims. (Cl. 90—24)

The present invention pertains to a novel method of generating bearing surfaces on various structures and finds particular utility in structures where flat bearing surfaces of extreme length are required.

The problem of generating flat bearing surfaces of great length is especially acute in the construction of large machine tools, such as planers or boring mills used in machining ordnance and other implements of war. There are, even aside from machine tools, many other fields of use for the present invention, as, for example, in the construction of trackways for towing carriages of model testing basins. In all such instances the constructor is confronted with the problem of fashioning, with a high degree of precision, a bearing surface of such great extent that it is either impossible to find an existing machine tool large enough to receive the work, or else such existing machine tools are so few in number that their output for wartime needs is prohibitively small.

Generally stated, the object of the present invention is to provide a novel method of generating a flat bearing surface, of even extremely great length, on a structure through the use of a temporary guide or reference surface for the surfacing tool, and which temporary guide surface is of such character that it can be formed in a level, precisely flat contour cheaply and expeditiously without machining of the same.

More specifically, it is an object of my invention to provide a novel method of generating a bearing surface of even extremely large length or area in which a guide or reference surface of temporary character is formed by solidifying a body of liquid, such as water, which is enabled to seek and retain a flat level contour for its top surface while in liquid condition and during its subsequent solidification, and the true flat contour of such temporary surface thereafter reproduced in permanent metal form by slidably guiding a surfacing tool on the temporary guide surface while the tool cuttingly engages the work, whereby to reproduce the true flat contour of the temporary guide on a metal work piece or structure.

Still another object of the invention is to provide a novel method of forming a temporary guide or reference surface for a surfacing tool in which the temporary surface is formed by freezing or solidifying a body of liquid, mechanically smoothing the solidified body of liquid to approximately flat contour, and thereafter forming a top surface of precisely flat contour for the temporary guide or reference surface by flowing an additional film of the liquid over the top of the solidified body and solidifying the final film of liquid by abstracting heat therefrom through the initial solidified body of liquid which it overlies so that the whole area of the film solidifies substantially simultaneously and uniformly, thereby avoiding any crowning of the same.

Further objects and advantages of the invention will become apparent as the following description proceeds, taken in connection with the accompanying drawings in which:

Figure 1 is a partial plan view of an apparatus adapted to generate a circular horizontal bearing surface on the base of a boring mill in accordance with my invention.

Fig. 2 is a side elevation, partially in section, of the apparatus shown in Fig. 1.

Fig. 3 is an enlarged detail sectional view of one of the temporary guide channels, taken substantially along the line 3—3 in Fig. 1, and showing an intermediate step in the solidification of liquid therein.

Fig. 4 is a view similar to Fig. 3, but illustrating the final step in solidification of liquid.

Fig. 5 is a plan view of an apparatus for generating bearing surfaces on rectilinear guideways of a planer in accordance with my invention.

Figure 6:
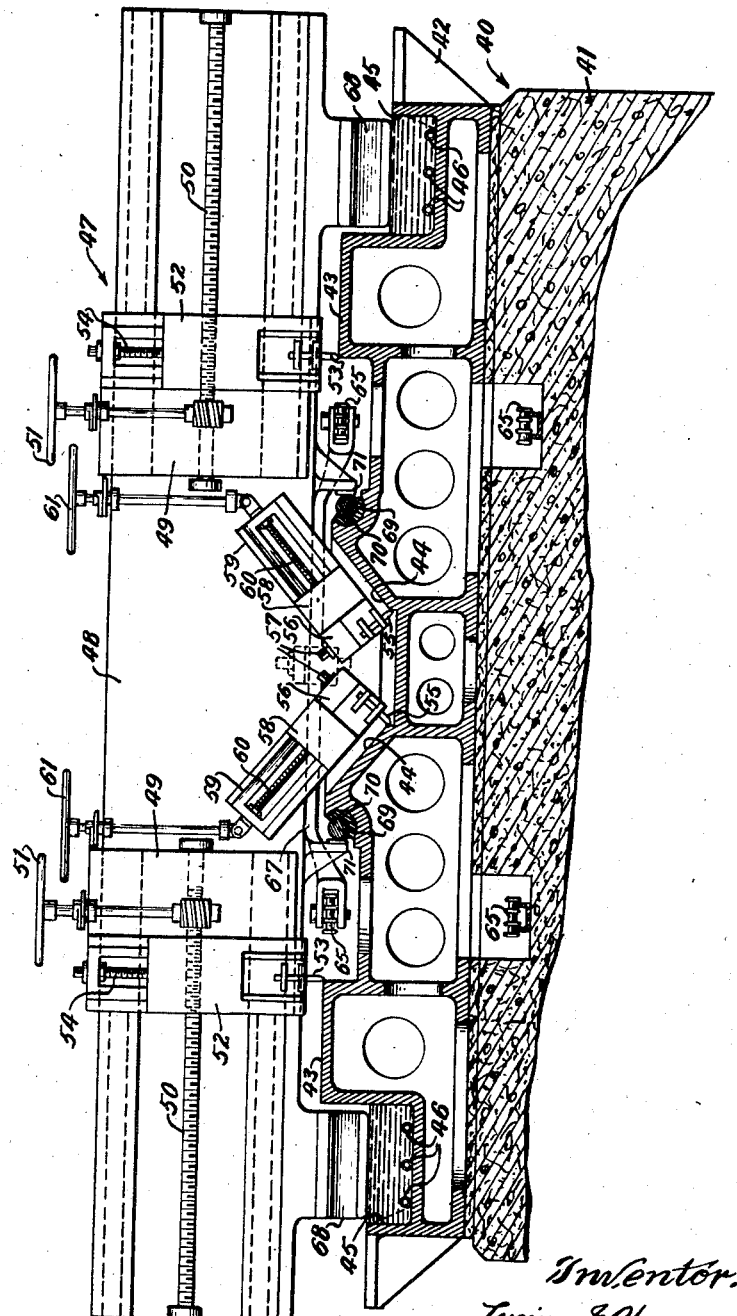
Fig. 6 is a transverse sectional view, taken substantially along the line 6—6 in Fig. 5.

While the invention is susceptible of various modifications and alternatives, I have herein described in detail the preferred mode of carrying out my novel method, but it is to be understood that I do not thereby intend to limit the invention to the specific details disclosed, but intend to cover all modifications and alternatives falling within the spirit and scope of the invention as expressed in the appended claims. In this same connection it should also be understood that the apparatus herein shown is merely a sampling of almost numberless devices that can be used in carrying out my novel method and that the latter is in no way limited to the particular apparatus or uses shown in the drawings.

In carrying out the novel method herein contemplated, the general procedure followed is to form a temporary guide or reference surface of the desired flat contour, and thereafter reproduce this flat contour in permanent form on some desired structure by guiding a surfacing tool on or with reference to the temporary surface as the tool moves in cutting engagement with the work. The great difficulty, of course, lies in forming the temporary guide surface itself in proper contour without machining the same. For that purpose I form the temporary guide surface by solidifying a body of liquid, the top of the body of liquid being left free so that it is permitted to seek its own level during solidification. In the event that the body of liquid initially solidified is of substantial depth, and if a liquid such as water is used, there is likely to be some crowning of the top surface, particularly if it is confined in a metal vessel so that a large percentage of the heat is abstracted through the metal walls of the vessel during this first solidification step. In such case, as a second step, I scrape or otherwise smooth the top of the solidified liquid to remove the crowning and to afford an approximately flat surface. Thereafter, a thin film of liquid is flowed or otherwise provided over the top of the previously solidified liquid and the final film is solidified by abstracting heat therefrom through the initially solidified body. In this way, a surface of truly flat contour is finally formed on the composite body of solidified liquid.

Two exemplary apparatuses for utilizing the invention are illustrated herein, but it will be understood that neither apparatus, as such, constitutes the present invention. That of Figs. 1 and 2 is particularly adapted for use in constructing boring machines, while that of Figs. 5 and 6 is particularly adapted for use in constructing planers. It will be clear to those skilled in the art from what follows that the present invention can, as a matter of fact, be applied to the generation of bearing surfaces or the like in a great variety of devices.

In Figs. 1 and 2 I have illustrated an apparatus of practical form adapted to utilize the present invention in construction of a boring mill of extremely great size. In Figs. 1 and 2, the numeral 10 designates generally the bed of a boring mill such as may be used for boring large ordnance and the like. The general construction of this boring mill bed is that disclosed for massive machine tools in my prior patent, No. 1,309,383, issued July 8, 1919. Thus, it comprises a base 11 of reenforced concrete, on the top of which are fixed metal bearing members 12 of sectional, in this case segmental, form. The members 12 are permanently united with the base 11 by suitable grouting and have reenforcing webs 13 formed in their lower sides at requisite points and which are embedded in the concrete. On each of the members 12 is a pair of arcuate pads 14a and 15a which are alined in the several members to form two circular bearing surfaces or ways 14 and 15 concentric with the vertical axis A—A machine.

The great, and heretofore practically insuperable, problem encountered in the construction of such a machine has been the surfacing of the ways 14 and 15 in such manner as to generate flat bearing surfaces thereon within the limitation of tolerance permissible in such a machine for present day practice, that is to say, within limitation of at most a few thousandths of an inch for the full length of each track, which may be many feet in circumference. The present invention affords an economical and highly effectual solution to that problem.

In applying the present invention in the construction of a machine bed of Figs. 1 and 2, the sections 12 are initially shaped to provide arcuate recesses of channel-shaped cross-section, alined in the several sections so as to form an annular trough 16 centered on the axis A—A. This trough 16 receives a body of liquid, as hereinafter detailed, for forming a temporary guide surface used in generating the required bearing surfaces on the ways 14 and 15.

In assembling the structure, the sections 12 are set in place and the surfaces of the rough pads 14a and 15a thereon are roughly alined with each other and roughly leveled by the use of spirit levels or other instrumentation and the sections grouted in place. Instrument alinement is not only tedious and expensive, requiring highly skilled labor, but even with greatest expertness it rarely yields the degree of accuracy of surface required in the finished machine. It is contemplated herein that such instrument leveling shall be carried out only to a limited degree of exactitude and which is intended simply to minimize the amount of machining which is to follow and not at all to attempt to reach the exactitude of surface accuracy required in the finished product.

After the sections 12 have been fixed in place as described above, the joints therebetween are caulked, particularly between the abutting ends of the arcuate recesses which form the trough 16. Thereafter the annular trough 16 is partially filled with some suitable liquid, water having been found to be desirable for the purpose. A liquid comprised, at least in major part, of water is desirable because it is cheap, solidifies at a temperature not too difficult to attain with ordinary refrigerating apparatus, and has reasonably good characteristics for present purposes with respect to changes in volume upon solidification. The body of water in the trough 16 is solidified or frozen by refrigerating or evaporating coils 17 extending about the trough and supplied with refrigerant from a suitable source (not shown) through connections 18. When a body of water, of the depth of several inches as indicated, freezes, and particularly when the freezing is effected by the abstraction of heat in a metal vessel so that most of the heat flows out of the water through the walls of the vessel, the freezing or solidification takes place from the walls of the vessel toward the center of the top surface of the body of liquid, and as a result there is likely to be a bulging or crowning of the free top surface. Such a center crown is indicated in somewhat exaggerated form at C in Fig. 3.

As the next step in the process, the center crown of ice at C (Fig. 3) is scraped off or otherwise mechanically removed so that the ice presents a substantially flat horizontal surface indicated at the line S—S. Such mechanical surfacing of the ice should be carried out with a fair degree of accuracy, although a large tolerance, as compared to the accuracy of the final surface, is permissible. After the top of the initial body of ice has been scraped fairly flat it is covered by a thin film of the liquid (desirably the same as that used in the first solidification step) flowed over or otherwise provided on the top of the ice, the film being just deep enough to be sure that it covers all high spots on the ice. The additional film of water is indicated in exaggerated thickness at 19 in Fig. 4. This final film of water is then frozen by abstracting heat therefrom through the initial body of ice, the circulation of refrigerant through the coils 17 being continued for this purpose.

The feature of freezing the final film of liquid by abstraction of heat therefrom through the underlying solidified body of liquid is of prime importance. It is important for by that means the final film of liquid is solidified substantially simultaneously throughout its entire area, thereby avoiding crowning or buckling due to expansion.

Care must be exercised to see that both the first and second batches of water are free of air or other occluded gases and that the vessel in which the water is received is not subjected to vibration or other disturbance as the freezing progresses. Upon the completion of the steps outlined, the ice in the trough 16 will present a top surface of mirror smoothness and have a flatness of contour well within the tolerance limitation permissible for the finished bearing surfaces in the machine.

In the event that the liquid used is, in whole or in major part, water, a further step in the process is desirably utilized. As such further step, a thin film of protective liquid is flowed over the final top surface of the ice. Such protective liquid must be of such character that it remains highly fluid at temperatures well below the freezing point of water and that it does not mix with water to any appreciable degree. By way of example, kerosene is suitable for the purpose. When the ice surface is covered with such a protective liquid film, change in contour of the ice surface due to vaporization or sublimation of the ice is effectually prevented.

The smooth top surface of the ice in the trough 16 is used as a guide surface for a suitable tool carriage or fixture. In the particular arrangement shown in Figs. 1 and 2, this fixture is illustrated as comprising a horizontal beam 20, journaled on an upright post 21 at the center of the bed 10 to swing about the axis A—A. The beam 20 is revolved about the axis A—A by a suitable power drive, which in the present instance comprises a sprocket 22 fixed on a shaft 23 journaled on the outer end of the beam 20 and driven by an electric motor 24 through a worm and worm wheel reduction gearing 25. Trained over the sprocket 22 is an endless roller chain 26 which encircles the bed 10 and is held in tight frictional engagement with the latter by an idler sprocket 27. The latter is mounted on a pivotally adjustable bracket 28 and is forced into the loop of the chain to maintain requisite tension in the latter. Thus, as the drive sprocket 22 revolves in a counterclockwise direction (as viewed in Fig. 1) it rolls along the chain and revolves the beam 20 in a counterclockwise direction.

Mounted on the beam 20 are two tool heads 29 and 30 for machining the ways 14 and 15, respectively. Each of these tool heads has thereon a tool slide 31 carrying a suitable surfacing tool of either the cutting or abrasive type, in this case shown as a planing tool 32, and which is vertically adjustable by means of a wrench-operated screw 33 to adjust the depth of cut. Transverse feed is imparted to the tool heads by suitable lead screws 34 operated by handwheels 34a in this instance, although, of course, power feed may be used if desired.

The revolving beam 20 is supported and guided on the temporary ice guide surface by a shoe 35 pivotally mounted on a head 36 adjustably fixed to the beam. Preferably a suitable source of refrigerant (not shown) is carried by the fixture beam 20 and arranged to supply refrigerating coils embedded in the shoe 35 so as to retain the latter at or below the temperature of the ice in the trough 16.

From the foregoing, it will be seen that as the fixture beam 20 revolves, the engagement of the shoe 35 with the surface of the temporary ice bearing guides the beam so that the tools 32 generate precisely flat horizontal surfaces on the ways 14 and 15. The ice is retained frozen in the trough 16 by the refrigerating coils throughout the machining of the ways 14 and 15. Not only is the surface of the temporary guideway, formed by the solidified liquid, extremely smooth and accurate in contour, but, when formed of ice no additional lubrication of the shoe 35 is required for smooth and almost effortless movement. In actual practice it is difficult to tell whether or not the shoe is lubricated by a minute film of water which may conceivably be formed by melting of the ice surface due to the heat of friction, and subsequently refrozen as the shoe passes on, or whether the shoe and ice surface are actually dry at the area of contact. There is, however, no doubt that the shoe glides along the ice surface with extreme ease and that if any actual melting and refreezing of the ice surface does take place that it is confined to such a minute layer that it does not affect the accuracy of the machine. In the event that a protective film of liquid, such as kerosene, is used, it also serves as a lubricant for the shoe.

After the ways 14 and 15 have been surfaced as described above, the fixture can be removed, the ice melted from the trough 16 and the resulting liquid drained away. Thereafter the coils 17 may be lifted out of the trough and the machine bed 10 is ready for service.

The apparatus of Figs. 5 and 6 illustrates the application of the herein disclosed method to the generation of rectilinear bearing surfaces as distinguished from the circular bearing surfaces of Figs. 1 and 2. In Figs. 5 and 6 is shown the bed 40 of a horizontal planer. As in the case of the bed 10 of Figs. 1 and 2 described above, the bed 40 comprises a concrete base 41 to which is grouted a series of metal sections 42. On the latter are alined pads 43a and 44a which form longitudinal pairs of bearing surfaces or ways 43 and 44. In assembling the sections 42 on the base 41 the pads or sections, which make up the ways, are roughly alined and roughly leveled by instrumentation during fixing of the sections to the base, all as heretofore described in connection with Figs. 1 and 2.

To provide a temporary guide surface for final machining of the ways, the sections 42 are recessed to form an open-topped trough 45 bordering the top of the bed 40. In the same manner as heretofore described, a body of water or other suitable liquid is frozen in the trough 45 by refrigerating coils 46, the surface of the frozen liquid mechanically smoothed, covered with a film of liquid, and the latter frozen by abstraction of heat through the initial body of solidified liquid to form a precisely flat and mirror smooth top surface. By using a trough, as shown, in which the portions in the two sides of the bed 40 are interconnected, equality of level for the ice surface in the portions of the trough on such two sides is assured.

A fixture, designated generally as 47, is provided for machining the pads 43a and 44a to form the ways 43 and 44, this fixture being slidably supported on the temporary ice guide surface in the trough 45. The fixture comprises a horizontal beam 48 on which are horizontally slidable heads 49. Lead screws 50, operated by handwheels 51, traverse the heads 49 along the beam 48. On the heads 49 are tool slides 52 carrying surface tools 53, the slides being vertically adjustable by wrench-operated screws 54 to adjust the depth of cut. By means hereinafter described, the fixture is traversed back and forth along the length of the bed 40, the heads 49 being fed laterally in timed relation to reciprocation of the fixture, whereby to surface the ways 43 by the tools 53.

The other pair of ways 44 are surfaced by tools 55 in tool slides 56, the latter being transversely adjustable by screws 57 on heads 58. Since the ways 44 are inclined, rather than horizontal, the heads 58 are mounted on correspondingly inclined ways 59 in the beam 48, instead of horizontal ways as in the case of the heads 52. Lead screws 60, operated by handwheels 61, feed the heads 58 along the ways 59, i. e., transversely of the ways 44 being machined.

To reciprocate the fixture 46 along the bed 40, a reversible electric drive motor 62 is utilized. It is connected to a pair of drive sprockets 63 through a speed reduction gearing 64. A pair of endless roller chains 65 are train over the sprockets 63 and a corresponding pair of idler sprockets 66 at the opposite end of the machine. An equalizer bar 67 connects the motor driven chains 65 to the fixture 47, the bar being pivoted at its center to the fixture and at its opposite ends to the chains 65.

In order to guidingly support the fixture 47 on the temporary ice surface formed in the trough 45, elongated shoes 68 are provided on the fixture and positioned to rest on the surface of the ice in the respective longitudinal legs of the trough 45. Preferably these shoes are refrigerated by refrigerant supplied from a suitable refrigerating unit (not shown) carried in the fixture 47, so that the shoes are retained at or below the temperature of the ice. As the shoes 68 glide along the precisely flat surface of the ice the fixture 47 is, accordingly, retained precisely level for accurate surfacing of the ways 43 and 44.

Lateral guiding of the fixture 47 is also required in the present instance. For that purpose a pair of guide bars 69 are provided on each of the bed sections 42. These bars are permanently fixed in place on their respective sections prior to the alinement of the latter on the base. To fixe the bars in place, molten type metal is poured between them and in the section as indicated at 70 and in addition locking dowels or screws (not shown) may be used.

Coacting with the lines of guide bars 69 are corresponding pairs of guide shoes 71. In each pair, one of the shoes is fixed on the lower side of the beam 48 and the other on a bracket 72 which projects forwardly from the beam.

From the foregoing it will be perceived that I have provided a method of generating flat bearing surfaces which is adaptable to an extremely wide variety of uses. By utilizing the hereinbefore described mode of providing a temporary guide or reference surface of precision-flat contour without machining, it is possible greatly to expedite and cheapen the manufacture of large machines which heretofore consumed a tremendous amount of tedious work by highly skilled mechanics.

The present application is a continuation-in-part of my earlier application, Serial No. 440,165, filed April 23, 1942, for "Method of generating bearing surfaces."

I claim as my invention:

1. The method of generating a flat bearing surface on a piece of work, which comprises, solidifying a quiescent body of liquid, comprised at least in major part of water, within an open-topped vessel so that the exposed top of the liquid is free to seek its own level, mechanically smoothing the exposed top surface of the solidified body of liquid to approximately level condition, flowing an additional thin film of the liquid onto the top of the body of solidified liquid to a sufficient depth to completely cover the latter, solidifying the additional liquid by abstracting heat therefrom through the initially solidified body of liquid, and moving a surfacing tool across the work to be machined while guiding the movement of the tool by the final top surface of the solidified bodies of liquid.

2. The method of generating a guide surface of large extent, which comprises, forming a guide surface of temporary character by solidifying a body of material which is liquid at normal room temperature and with the top surface of the liquid free so that such top surface of the solidified liquid is of flat contour, and reproducing such flat contour of the temporary guide surface as a permanent bearing surface on a metal structure by guiding a surfacing tool by said temporary surface while such tool is actively engaging the metal structure.

3. The method of generating a flat bearing surface on a structure, which comprises forming a temporary way for a tool carriage by solidifying a body of material which is liquid at normal room temperature and with the top surface thereof exposed to form a horizontal surface of solidified liquid, supporting a tool carriage on said surface of the body of solidified liquid with the latter rigidly fixed against movement relative to the structure to be machined, and slidingly supporting the carriage on said surface in machining said structure by a surfacing tool carried by said carriage.

4. The method of generating a flat bearing surface on a piece of work, which comprises, solidifying a body of gas-free liquid comprised at least in major part of water and which is at rest within an open-topped vessel so that the surface of the liquid being solidified is free to seek its own level, and moving a surfacing tool across the work to machine it while guiding the movement of the tool by said top surface of the solidified body of liquid.

5. The method of generating a guide surface of flat contour, which comprises, forming a guide surface of temporary character by solidifying a liquid in a vessel in which the top of the liquid is left free to seek its own level in the course of the solidification, and reproducing the contour of the top of the solidified liquid as a permanent bearing surface on a metal structure.

6. The method of generating a flat bearing surface on a piece of work, which comprises, freezing a quiescent body of liquid, comprised at least in major part of water, within an open-topped vessel so that the exposed top of the liquid is free to seek its own level in the course of the freezing, mechanically smoothing the exposed top surface of the frozen body of liquid to approximately level condition, flowing an additional thin film of the same liquid onto the top of the body of frozen liquid to a sufficient depth to completely cover the latter, freezing the additional liquid by abstracting heat therefrom through the initially frozen body of liquid, covering the final frozen layer of liquid with a thin film of protective liquid which remains highly fluid at a temperature well below the freezing point of the first-mentioned liquid and which does not mix with the latter to any appreciable extent, and moving a surfacing tool across the work to be machined while guiding the movement of the tool by the final top surface of the frozen bodies of liquid.

7. The method of generating a guide surface of large extent, which comprises, forming a guide surface of temporary character by freezing a body of liquid composed at least in major part of water and with the top surface of the liquid free so that the same is free to seek its own level in the course of freezing, flowing a thin film of protective liquid over the top of the frozen body, such protective liquid being one which remains highly fluid at a temperature well below the freezing point of water and which does not mix with water to any appreciable extent, and reproducing the flat contour of the temporary guide surface as a permanent bearing surface on a metal structure by guiding a surfacing tool by said temporary surface while such tool is actively engaging the metal structure.

8. The method of forming a precisely flat reference surface for use in machining operations and the like, which comprises, the freezing of a body of water, mechanically smoothing the top of the resulting body of ice to substantially flat contour, covering the smoothed top of the ice with a thin film of water to a depth just sufficient to insure complete coverage of all high spots on the ice, freezing the final film of water by abstraction of heat therefrom through the underlying initial body of ice, and flowing over the ice a protective film of liquid which remains highly fluid at temperatures well below the freezing point of water and which does not mix with water to any appreciable extent, whereby to present sublimation of the ice.

LUCIEN I. YEOMANS.